US011835027B2

(12) United States Patent
Hernandez Ferre (10) Patent No.: US 11,835,027 B2
(45) Date of Patent: Dec. 5, 2023

(54) SUPPORTING STRUCTURES AND METHODS FOR A CENTRAL FRAME OF A DIRECT-DRIVE WIND TURBINE

(71) Applicant: General Electric Renovables Espana, S.L., Barcelona (ES)

(72) Inventor: Alejandro Hernandez Ferre, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/834,095

(22) Filed: Jun. 7, 2022

(65) Prior Publication Data

US 2022/0397094 A1    Dec. 15, 2022

(30) Foreign Application Priority Data

Jun. 15, 2021  (EP) .................................... 21382531

(51) Int. Cl.
  *F03D 13/20*   (2016.01)
  *F03D 15/20*   (2016.01)
  *F03D 80/50*   (2016.01)

(52) U.S. Cl.
  CPC ............. *F03D 13/20* (2016.05); *F03D 15/20* (2016.05); *F03D 80/50* (2016.05); *F05B 2240/912* (2013.01); *F05B 2260/30* (2013.01)

(58) Field of Classification Search
  CPC .......... F03D 15/20; F03D 13/20; F03D 80/50; F05B 2240/912; F05B 2260/30
  See application file for complete search history.

(56) References Cited

U.S. PATENT DOCUMENTS

| 7,360,310 | B2 | 4/2008 | Bagepalli et al. |
| 8,841,791 | B2 | 9/2014 | Booth |
| 10,487,581 | B2 | 11/2019 | Wang et al. |
| 2006/0152016 | A1 | 7/2006 | Bywaters et al. |
| 2010/0019502 | A1 | 1/2010 | Pabst et al. |
| 2013/0099503 | A1 | 4/2013 | Bagepalli et al. |
| 2013/0214540 | A1 | 8/2013 | Gelmini et al. |
| 2013/0292948 | A1 | 11/2013 | Pallotti et al. |

(Continued)

FOREIGN PATENT DOCUMENTS

| CN | 201165940 Y | 12/2008 |
| CN | 103161680 B | 4/2015 |

(Continued)

OTHER PUBLICATIONS

European Search Report Corresponding to EP21382531.8 dated Nov. 18, 2021.

*Primary Examiner* — Courtney D Heinle
*Assistant Examiner* — Andrew Thanh Bui
(74) *Attorney, Agent, or Firm* — Dority & Manning, P.A.

(57) ABSTRACT

The present disclosure relates to supporting structures for a central frame of a direct-drive wind turbine and methods for managing such structures. A supporting structure is configured to assume a deployed configuration and a stowed configuration. In the stowed configuration, the supporting structure has a shape and size such that the supporting structure can be introduced into the central frame from an outside. In the deployed configuration, the supporting structure has one or more increased dimensions with respect to the stowed configuration, and comprises a working platform.

15 Claims, 8 Drawing Sheets

(56) References Cited

U.S. PATENT DOCUMENTS

| | | | |
|---|---|---|---|
| 2014/0050591 A1 | 2/2014 | Munk-Hansen | |
| 2014/0147279 A1 | 5/2014 | Lind | |
| 2015/0016976 A1 | 1/2015 | Roer et al. | |
| 2017/0022966 A1* | 1/2017 | Therkildsen | F03D 80/88 |
| 2017/0030328 A1 | 2/2017 | Gudewer et al. | |
| 2021/0033073 A1 | 2/2021 | Hemmelmann et al. | |
| 2022/0325700 A1* | 10/2022 | Kristoffersen | E04G 3/24 |

FOREIGN PATENT DOCUMENTS

| | | |
|---|---|---|
| DE | 102004028746 A1 | 12/2005 |
| DE | 102004031329 A1 | 1/2006 |
| DE | 102018100864 A1 | 7/2019 |
| EP | 1925820 A1 | 5/2008 |
| EP | 1956235 A1 | 8/2008 |
| EP | 2698529 B1 | 10/2015 |
| EP | 3253966 A1 | 12/2017 |
| EP | 2853735 B1 | 10/2018 |
| WO | WO 01/42647 A2 | 6/2001 |
| WO | WO2014/032826 A1 | 3/2014 |

* cited by examiner

SUPPORTING STRUCTURES AND METHODS FOR A CENTRAL FRAME OF A DIRECT-DRIVE WIND TURBINE

The present disclosure relates to wind turbines, in particular to supporting structures and related methods for a central frame of a direct-drive wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through a gearbox. This way, the generator produces electricity which can be supplied to the electrical grid.

In wind turbines with a gearbox, the gearbox usually increases the speed of the wind-driven rotor and therefore the required size of the generator may be reduced. In contrast, directly driven generators, for example used in offshore direct-drive wind turbines, operate at the same rotational speed as the rotor. They therefore generally have a much larger diameter than generators used in wind turbines having a gearbox for providing a similar amount of power than a wind turbine with a gearbox.

A rotor shaft may be rotatably mounted on a bedplate above the tower using one or more rotor shaft bearings arranged on the bedplate. In a direct-drive wind turbine, a bedplate may be a bottom of a frame or may be coupled to a bottom flange of a frame. The frame may cover the components arranged on the bedplate and may transfer loads to the tower. A frame may be made of cast steel. Yaw motors and electric cabinets may be on the bedplate and may be covered by the frame.

A nacelle, which is a housing arranged on top of a wind turbine tower, may cover and protect at least the components on the bedplate. In a direct-drive wind turbine the nacelle may cover at least the frame.

In direct-drive wind turbines, temporary supporting structures may be placed inside a frame to access different parts of the wind turbine, for example the rotor hub, the generator and the nacelle. Access to one or more of these parts may be needed during assembly and/or installation of the wind turbine. Access may also be required for maintenance operations.

Mounting supporting structures inside the frame each time they are needed may be time consuming and may delay accessing the required place or component. This may particularly apply when different supporting structures, for example structures of different heights or shapes, are required for different tasks in different places.

SUMMARY

In an aspect of the present disclosure, a supporting structure for a central frame of a direct-drive wind turbine is provided. The supporting structure is configured to assume a deployed configuration and a stowed configuration. In the stowed configuration, the supporting structure has a shape and size such that the supporting structure can be introduced into the central frame from and outside. In the deployed configuration, the supporting structure has a one or more increased dimensions with respect to the stowed configuration and comprises a working platform.

According to this aspect, the dimensions of a supporting structure may be reduced to easily introduce it into the central frame. For example, a supporting structure may be folded for reducing the space that it occupies. Once inside the central frame, it may be deployed, e.g. by unfolding it.

Folding may also facilitate to introduce an assembled supporting structure (or at least assembled in part) in the central frame, instead of bringing and installing components one by one. Assembly and installation time of the central frame may be reduced. The supporting structure may be assembled, at least partially, outside the main production line. Efficiency in the main line may be therefore improved.

Furthermore, folding may enable to incorporate more than one functionality into the supporting structure or to access different places or components in the central frame once the supporting structure is deployed. Maintenance time in the central frame or places where access is needed from the central frame may therefore be reduced. Temporary platforms may be avoided.

Additional components or parts of the supporting structure may be placed inside the central frame after the first and second sides have been unfolded in the central frame.

Throughout this disclosure, a central frame may be understood as a structural component of a direct-drive wind turbine configured to transfer loads and vibrations acting on the rotor of the wind turbine to the tower of the wind turbine. A central frame may be also known as base frame, main frame or rear frame. A bottom of the central frame may be connected to the tower of the wind turbine. The electrical generator may be connected to a front side of the central frame, or to a front frame attached at a front side of the central frame.

In a further aspect, a method for handling a supporting structure for use in a central frame of a direct-drive wind turbine is provided. The method comprises lifting and introducing the supporting structure into the central frame while the supporting structure is in a stowed configuration. The method further comprises attaching the supporting structure to the central frame and deploying the supporting structure.

In yet a further aspect, a supporting structure for a central frame of a direct-drive wind turbine is provided. The supporting structure comprises a first side comprising a first lateral platform, a second opposite side comprising a second lateral platform, and a central portion comprising a central platform. The first and second lateral platforms are above the central platform and are configured to be rotated and slid with respect to the central platform.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
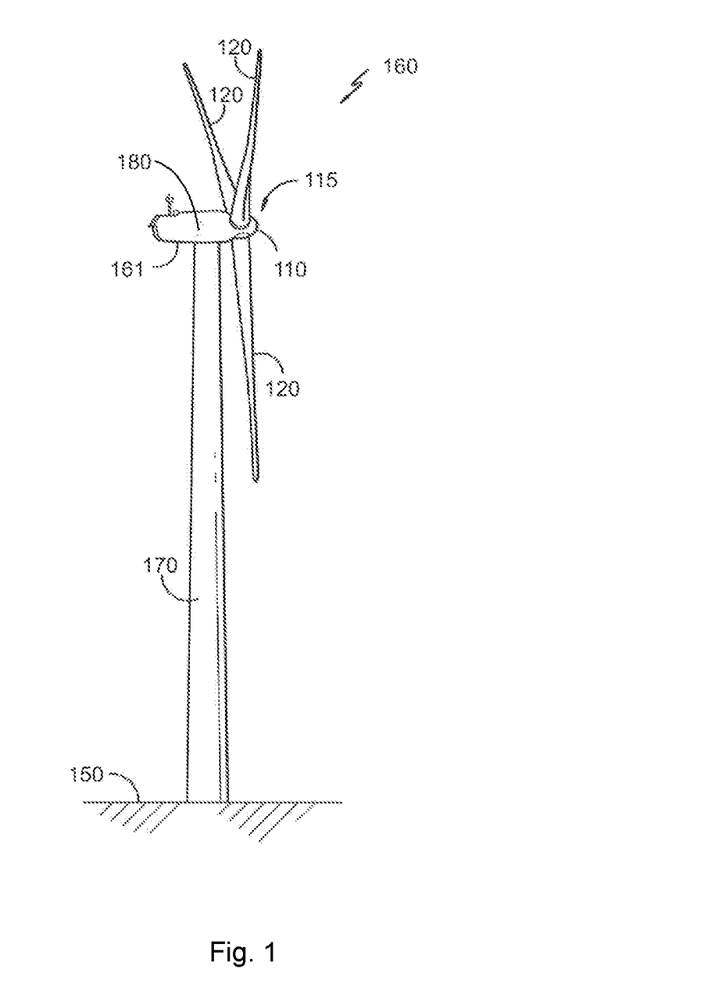
FIG. 1 schematically illustrates a perspective view of one example of a wind turbine.

FIG. 1 illustrates a perspective view of one example of a wind turbine 160. In the example, the wind turbine 160 is a horizontal-axis wind turbine. As shown, the wind turbine 160 includes a tower 170 extending from a support surface 150, a nacelle 161 mounted on the tower 170, and a rotor 115 coupled to the nacelle 161. The rotor 115 includes a rotatable rotor hub 110 and at least one rotor blade 120 coupled to and extending outwardly from the rotor hub 110. For example, in the illustrated example, the rotor 115 includes three rotor blades 120. However, in an alternative embodiment, the rotor 115 may include more or less than three rotor blades 120. Each rotor blade 120 may be spaced from the rotor hub 110 to facilitate rotating the rotor 115 to enable kinetic energy to be transferred from the wind into usable mechanical energy, and subsequently, electrical energy. For instance, the rotor hub 110 may be rotatably coupled to an electric generator 3 (FIG. 2) to permit electrical energy to be produced.

The tower 170 may be fabricated from tubular steel to define a cavity (not shown in FIG. 1) between a support surface 150 and the nacelle 161. In an alternative embodiment, the tower 170 may be any suitable type of a tower having any suitable height. According to an alternative, the tower can be a hybrid tower comprising a portion made of concrete and a tubular steel portion. Also, the tower can be a partial or full lattice tower.

In examples, the rotor blades 120 may have a length ranging from about 15 meters (m) to about 90 m, 120 m or more. Rotor blades 120 may have any suitable length that enables the wind turbine 160 to function as described herein. For example, non-limiting examples of blade lengths include 20 m or less, 37 m, 48.7 m, 50.2 m, 52.2 m or a length that is greater than 91 m. As wind strikes the rotor blades 120 from a wind direction, the rotor 115 is rotated about a rotor axis. As the rotor blades 120 are rotated and subjected to centrifugal forces, the rotor blades 120 are also subjected to various forces and moments. As such, the rotor blades 120 may deflect and/or rotate from a neutral, or non-deflected, position to a deflected position.

Moreover, a pitch angle of the rotor blades 120, i.e., an angle that determines an orientation of the rotor blades 120 with respect to the wind direction, may be changed by a pitch system to control the load and power generated by the wind turbine 160 by adjusting an angular position of at least one rotor blade 120 relative to wind vectors. During operation of the wind turbine 160, the pitch system may particularly change a pitch angle of the rotor blades 120 such that the angle of attack of (portions of) the rotor blades are reduced, which facilitates reducing a rotational speed and/or facilitates a stall of the rotor 115.

A blade pitch of each rotor blade 120 may be controlled individually by a wind turbine controller 180 or by a pitch control system. Alternatively, the blade pitch for all rotor blades 120 may be controlled simultaneously by said control systems.

Further as the wind direction changes, a yaw direction of the nacelle 161 may be rotated about a yaw axis to position the rotor blades 120 with respect to wind direction.

The wind turbine controller 180 may be centrally located within the nacelle 161. However, in other examples, the wind turbine controller 180 may be located within any other component of the wind turbine 160 or at a location outside the wind turbine. Further, the controller 180 may be communicatively coupled to any number of components of the wind turbine 160 in order to control the operation of such components.

The wind turbine controller 180 may include one or more processor(s) and associated memory device(s) configured to perform a variety of computer-implemented functions (e.g., performing the methods, steps, calculations and the like and storing relevant data as disclosed herein). The wind turbine controller may perform various different functions, such as receiving, transmitting and/or executing wind turbine control signals and controlling the overall operation of the wind turbine. The wind turbine controller may be programmed to control the overall operation based on information received from sensors indicating e.g. loads, wind speed, wind direction, turbulence failure of a component and other.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure the controller to perform the various functions as described herein.

The wind turbine 160 of FIG. 1 may be placed in an offshore or onshore location. The wind turbine of FIG. 1 may be a direct-drive wind turbine.

Figure 2:
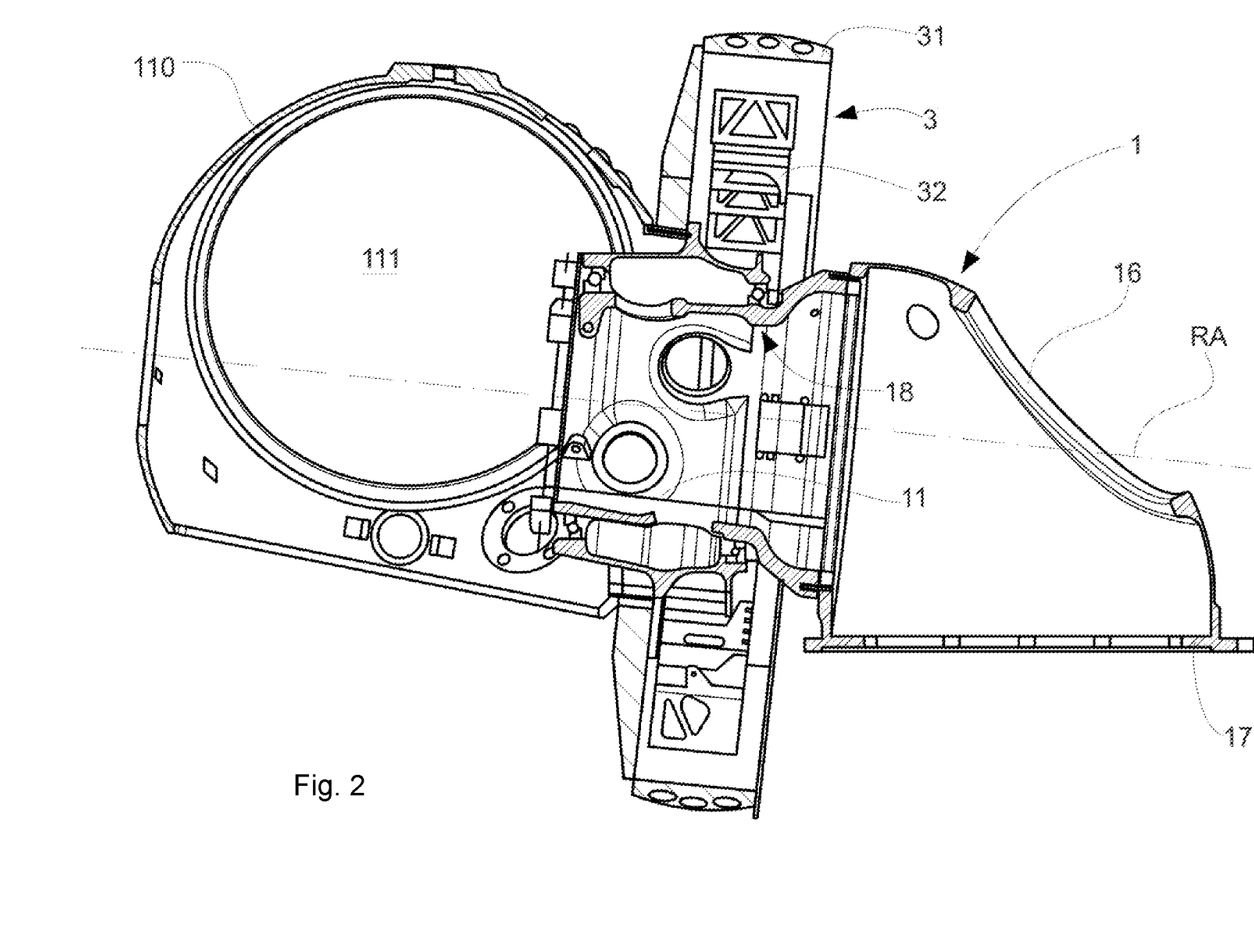
FIG. 2 illustrates a simplified, internal cross-sectional view of one example of the nacelle and a rotor hub of the wind turbine of FIG. 1.

FIG. 2 illustrates a simplified, internal cross-sectional view of the nacelle 161 and the rotor hub 110 of a direct-drive wind turbine 160 such as the one in FIG. 1. Some elements of the wind turbine 160 have not been illustrated for the sake of clarity. As shown, the generator 3 may be coupled to the rotor hub 110 of the wind turbine 160 for generating electrical power from the rotational energy generated. Thus, rotation of the rotor hub 110 drives the generator 3.

It should be appreciated that frame 1 and generator 3 may generally be supported by a support frame or bedplate 17 positioned atop the wind turbine tower 170. The bedplate 17 may be a bottom portion or may be joined to a bottom flange of a frame 1. The nacelle 161 is rotatably coupled to the tower 170. The bedplate 17 may be rotatably coupled to a wind turbine tower 170.

The direct-drive wind turbine 160 of FIG. 2 comprises a generator 3 mounted on a frame 1. The generator 3 comprises a generator stator 32 and a generator rotor 31 configured to rotate about a rotation axis RA. The frame 1 has a protruding portion 11 extending beyond the generator 3.

As shown in FIG. 2, the first structure may have a tapered region 18 towards the rotor hub 110. The tapered region 18 may protrude from the generator 3 at least partially, towards the rotor hub 110. The generator rotor 31 may be rotatably mounted on the generator stator 32.

In the example illustrated in FIG. 2, the protruding portion 11 extends towards the rotor hub 110 of the wind turbine 160 along the rotation axis RA. Thus, the protruding portion 11 may extend in an upwind direction along the rotation axis RA.

In another example, the protruding portion may extend away from the rotor hub 110 of the wind turbine 160 along the rotation axis RA. The protruding portion 11 may extend towards the bedplate 17 or tower 170, i.e. the protruding portion 11 may be positioned in an opposite direction to the rotor hub 110 along the rotation axis RA. Therefore, the protruding portion 11 may extend in a downwind direction along the rotation axis RA.

Following with the example of FIG. 2, at least a part of the protruding portion 11 may be placed in a room 111 defined inside the rotor hub 110. The room 111 may be defined as the hollow body of the rotor hub 110.

In FIG. 2, the generator rotor 31 surrounds the generator stator 32. However, in other examples, the generator stator may surround the generator rotor.

The protruding portion 11 may be a front portion of the frame 1. The protruding portion 11 may be integrally formed with the frame 1 or may be separate from the frame 1. The frame 1 may have a rear portion 16 facing the bedplate 17 of the wind turbine 160 and/or the front portion of the frame 1.

A frame 1 without the protrusion 11 may be called central frame. A central frame 125 may transfer the loads and the vibrations acting on the rotor 115 of a wind turbine 160 to the tower 170 of the wind turbine 160. A central frame 125 may be made of cast steel. An example of a central frame 125 or of a portion of a central frame may be seen in FIGS. 3C-3E and 4C-4E. A central frame 125 may have a bottom opening 126, a front opening 127 and a rear opening 128, see e.g. FIG. 3C. The bottom opening 126 may enable passage between the central frame 125 and an inside of the tower 170, the front opening 127 may enable passage between the central frame 125 and an inside 111 of the rotor hub 110 or a front frame, and the rear opening 128 may enable passage between the central frame 125 and an inside of the nacelle 161.

One aspect of the present disclosure provides a supporting structure 200 for a central frame 125 of a direct-drive wind turbine 160. The supporting structure 200 is configured to assume a deployed configuration and a stowed configuration. In the stowed configuration, the supporting structure 200 has a shape and size such that the supporting structure can be introduced into the central frame 125 from an outside. In the deployed configuration, the supporting structure has one or more increased dimensions with respect to the stowed configuration and comprises a working platform. A working platform may be understood as a support where operators may stand on and move on.

One or more dimensions of the supporting structure 200 may be larger in the deployed state than in the stowed state. A length and/or a height and/or a width of the supporting structure 200 may be increased with respect to the stowed configuration. For example, a length may be larger in the deployed state of the supporting structure 200 than in the stowed state of the supporting structure 200.

A supporting structure 200 may comprise a central portion 215 and one or more side portions 205, 210 hingedly mounted with respect to the central portion 315. A first 205 and second 210 side portions may be configured to be folded towards the central portion 215.

The supporting structure 200 may further comprise one or more parts configured to move with respect to, e.g. towards, the central portion 215 from a first position to a second position. One or more parts configured to move may be slidably arranged with respect to the central portion 215. Such parts may be referred to as slidable parts 220. This may help to reduce the dimensions of the supporting structure for introducing it in the central frame as well.

A first example of a supporting structure 200 is shown in FIGS. 3A to 3E. The first side portion 205 and the second opposite side portion 210 are unfolded in FIG. 3A and folded in FIG. 3B. The supporting structure 200 is in a deployed configuration in FIG. 3A, and is in a stowed configuration in FIG. 3B. Hinges 207 or any suitable rotatable joint between the central portion 215 and the first 205 or second 215 side portions may enable folding the first and second side portions towards the central portion 215.

Figure 3A:
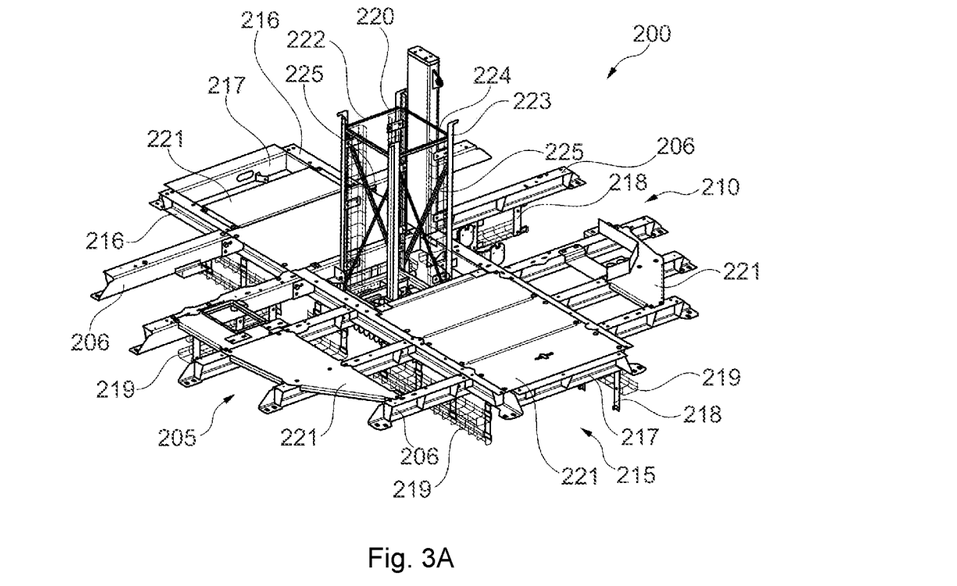
FIG. 3A schematically illustrates a perspective view of an example of a supporting structure for a central frame in a first deployed, or unfolded, position.
Figure 3B:
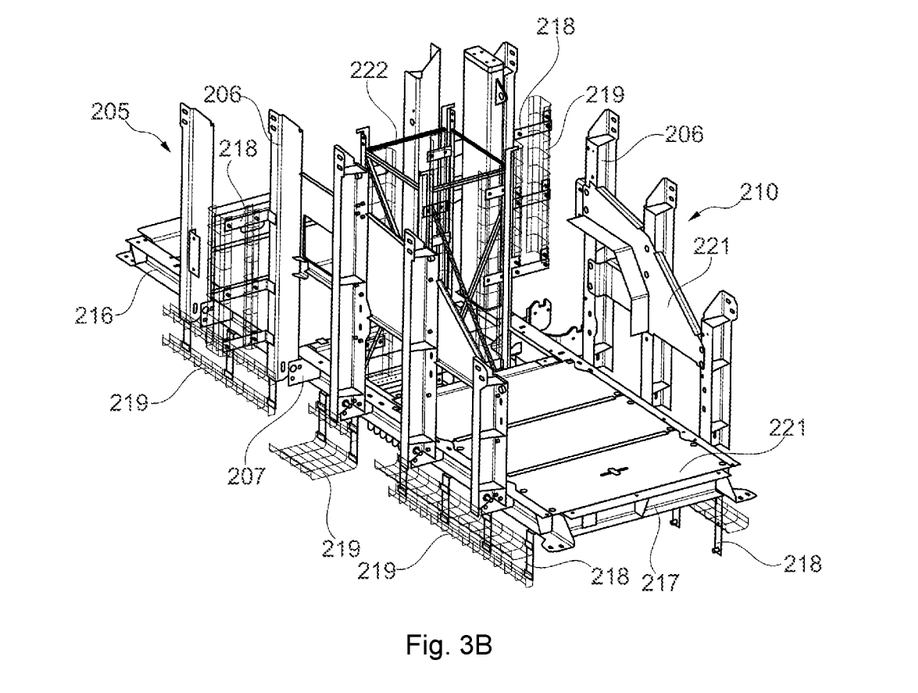
FIG. 3B schematically illustrates the supporting structure of FIG. 3A in a stowed, or folded, position.
Figure 3C:
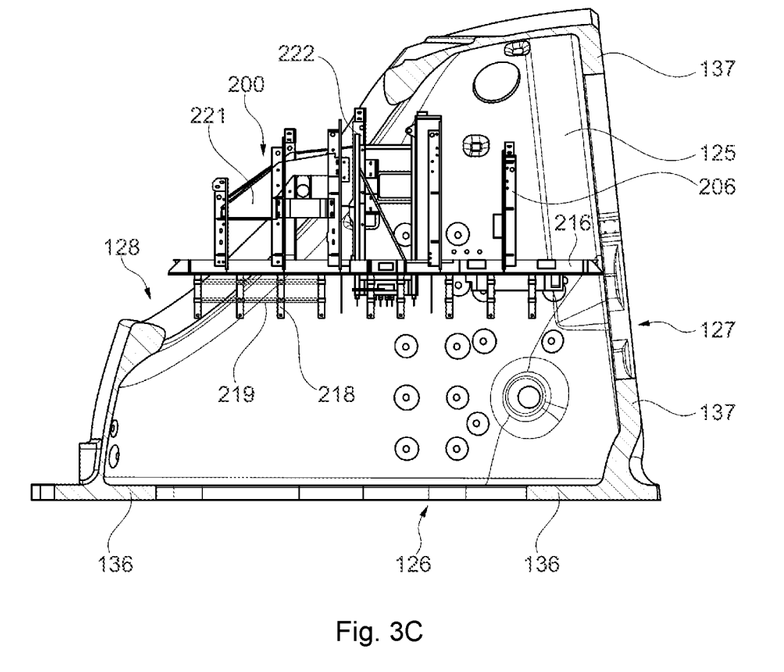
FIG. 3C schematically illustrates a cross-sectional view of the supporting structure of FIG. 3B being lifted inside a central frame.

Folding the supporting structure 200 may help to introduce the structure 200 inside a central frame 125, as illustrated in FIG. 3C. The folded supporting structure 200 may be lifted and entered in the central frame 125, for example through a rear opening 128 of the central frame 125. The rear opening 128 may be configured to be downwind.

The central portion 215 may comprise a first plurality of beams 216 and a second plurality of beams 217. The second plurality of beams 217 may be substantially perpendicular to the first plurality of beams 216. The first plurality of beams 216 may comprise two substantially parallel beams, and the second plurality of beams 217 may comprise two or more beams placed between the two substantially parallel beams and attached to the two substantially parallel beams by its ends. Attachment may be mechanical, e.g. through nuts and bolts or rivets. The first 216 and second 217 plurality of beams may form a base framework.

The central portion 215 may comprise a plurality of brackets 218. Brackets 218 may extend downwards (configured to extend towards an inside of the tower 170) and may include one or more hooks or hangers 219. A basket 219 may be supported by one bracket or by two or more brackets. Baskets may be used to support cables or any other suitable component.

The central portion 215 may further comprise one or more plates 221 attached, e.g. mechanically, to beams of the first 216 and second 217 plurality of beams. Operators may stand on one or more plates 221 and move around. Plates 221 may be substantially flat.

The first side portion 205 may comprise a plurality of beams 206. Beams 206 may be substantially parallel to each other and may be rotatably attached to the central portion 215. An end of a beam 206 may be directly or indirectly connected via a hinge 207 or any other suitable rotatable connector to a beam of the first plurality of beams 216. The cantilevered beams 206 of the first side portion 205 of the supporting structure 200 may be substantially parallel to the second plurality of beams 217 of the central portion 215 when the first side portion 205 is in an unfolded state as in FIG. 3A.

One or more brackets 218 may also extend downwards (in an unfolded position of the first side portion 205) from one or more beams 206, for example a central beam of the first side 205. One or more baskets 219 may be attached to one or more brackets 218. For example, a beam 206 may comprise two or more brackets 218 pointing downwards and a basket 219 may be attached to two or more of the brackets 218 of beam 206.

The first side portion 205 may further comprise one or more plates 221, each plate attached to two or more beams 206.

The features of the first side portion 205 may likewise be found in the second opposite side portion 210, as shown in FIGS. 3A and 3B In some examples, one of the one or more slidable parts 220 may be a column 222 configured to guide at least a cable from the central frame 125 down a wind turbine tower 170 in the deployed configuration. Such one or more cables may be configured to carry power generated by the generator 3 towards the electrical grid. A column 222 may be formed by four vertical beams 223 joined by horizontal struts 224, as for example as illustrated in FIG. 3A. Inclined struts 225 may be used to reinforce the column 222.

Figure 3D:
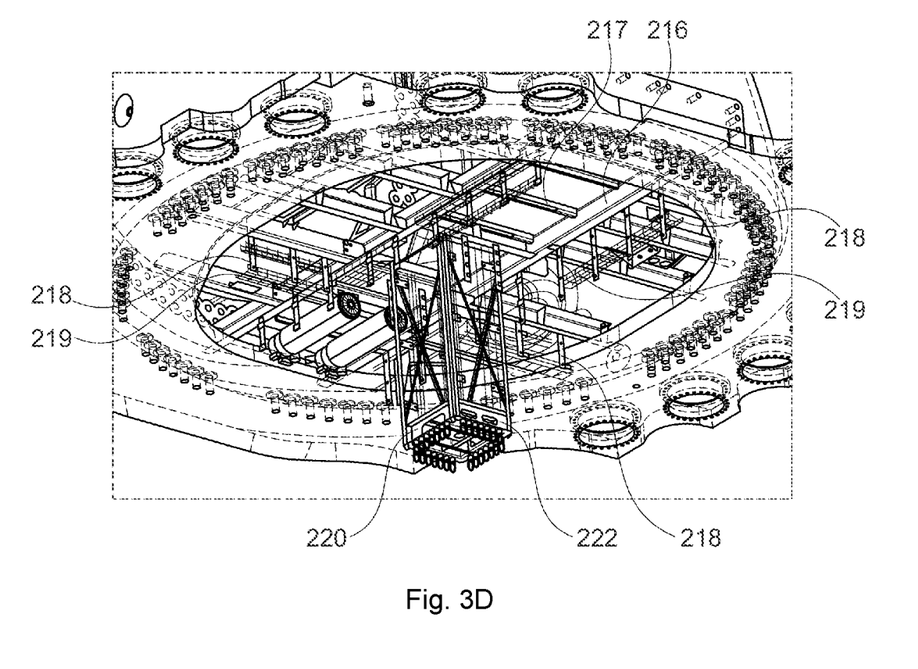
FIG. 3D schematically illustrates a perspective bottom view of the supporting structure of FIG. 3C deployed and placed on the bottom of the central frame.

A column 220 may be comprised in the central portion 215 of the structure. When the supporting structure 200 is outside the central frame 125, the column 222 may protrude upwards. This position may be a folded position for the column 222. Once the structure 200 is inside the central fame and it is unfolded, the column 222 may be slid downwards, as depicted in FIG. 3D. This may be an unfolded position for the column 222. Once unfolded, the supporting structure 200 may be attached to an inside flange 136 of a bottom of the central frame 125.

The supporting structure 200 may be made of one or more metals, such as steel.

Figure 3E:
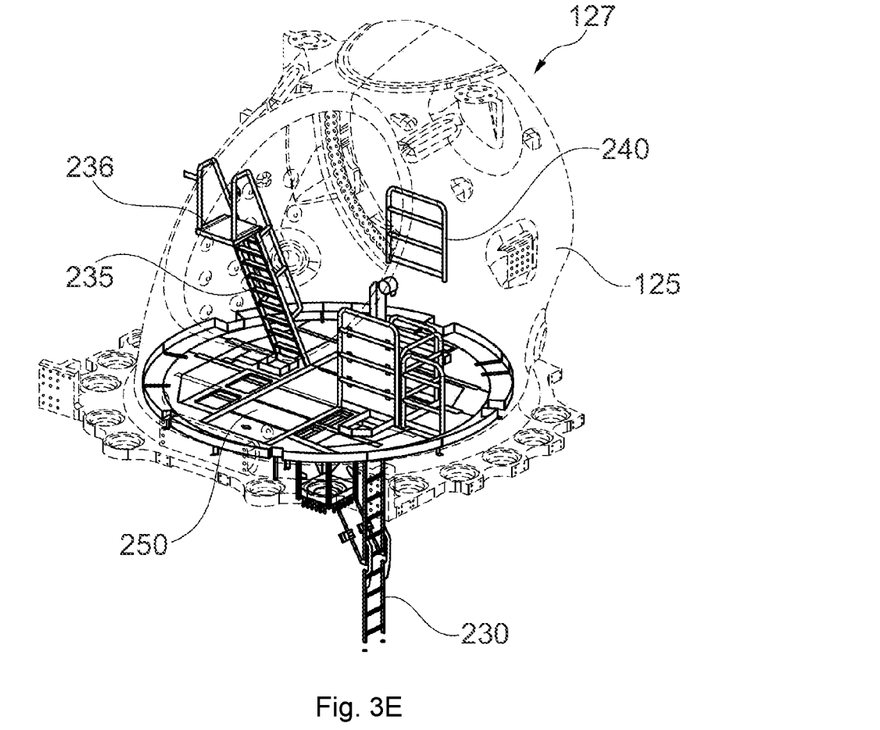
FIG. 3E schematically illustrates a perspective view of the supporting structure of FIG. 3D with added components mounted inside a central frame.

After attaching the supporting structure 200 to a bottom of the central frame 125, further components may be added. For example, as shown in FIG. 3E, a ladder 230 configured to extend into a wind turbine tower 170 and/or a ladder 235 configured to access the nacelle 161 may be added. Ladder 230 may be foldable. Ladder 235 may have a horizontal support 236 at its top. A door 240 to regulate access through the front opening 127 may also be included. Plates 221 may be added to one or more of the central portion 215 and the first 205 and second 210 side portions in order to create a floor 250. Floor 250 may be a bedplate 17 on which electrical cabinets and other equipment may be placed. Floor may be a working platform.

A second example of a supporting structure 200 is shown in FIGS. 4A to 4E. Supporting structure 200 is unfolded in FIG. 4A and folded in FIG. 4B.

Figure 4A:
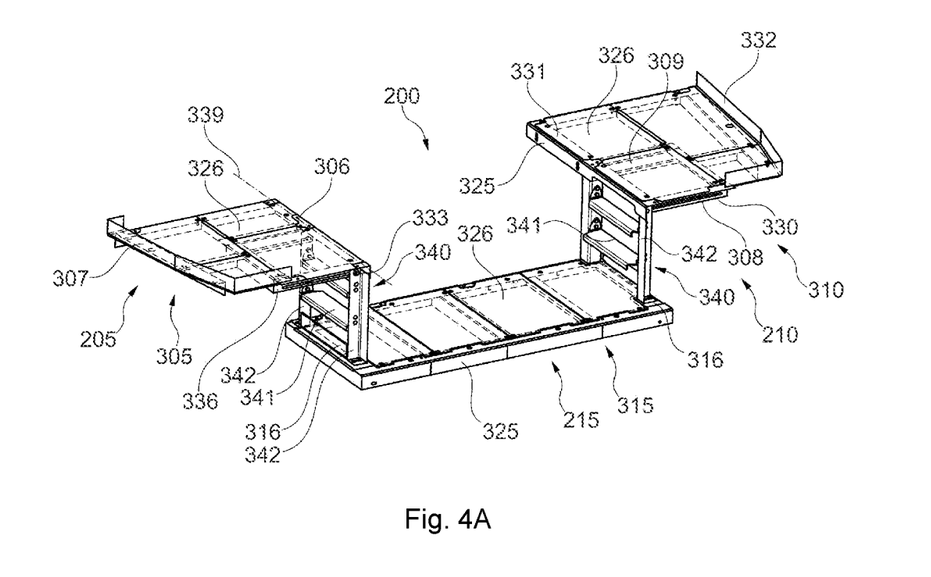
FIG. 4A schematically illustrates a perspective view of another example of a supporting structure for a central frame in a deployed, unfolded position.

The central portion 215 may comprise a central platform 315, the first side portion 205 may comprise a first lateral platform 305 and the second side portion 210 may comprise a second lateral platform 310. In the deployed configuration, the first 305 and second 310 lateral platforms may be arranged at a different vertical level than, e.g. above, the central platform 315. A platform may be formed by a frame comprising plate supports 325 such as beams and one or more plates 326 on the plate supports 325. Attachment between a plate 326 and a frame may be mechanical, e.g. by nuts and bolts. In some examples, plates and plate supports may be integrally formed. Plates 326 may be made of one or more plastics.

The central platform 315 may be rectangular. The side platforms 305, 310 may resemble a rectangle or a square except for an outside edge 307, 332 which may be configured to adapt to an inside surface of the central frame 125. An outside edge may include a protrusion or a flange which adapts to an inside surface of the central frame. Such an edge or flange may for example be rounded.

A joining element 340 may connect a lateral platform 305, 310 to the central platform 315. Two or more vertical beams, one or more vertical plates or any other suitable element may be used. The joining element 340 may support a lateral platform 305, 310 over the central platform 315.

The lateral platforms 305, 310 may be accessible from the central platform 315. The joining element 340 may comprise rungs 341. In some examples, a joining element 340 may be stairs, which may facilitate passage between the central platform 315 and a lateral platform 305, 310. Stairs 340 may be formed by two vertical beams or bars and one or more horizontal rungs between the two vertical beams or bars 342.

An inside edge or portion 306, 331 of a lateral platform 305, 310 may be vertically above an outside edge or portion 316 of the central platform 315 such that the supporting structure 200 has a U- or hat-shape in cross-section (in a cross-section including the joining elements 340) in an unfolded position, as in FIG. 4A.

The lateral platforms 305, 310 may be configured to rotate and to slide with respect, e.g. towards, the central platform 315. A lateral edge 308 of a lateral platform 305, 310 may have an elongated opening 330 which may engage a first rotational element 333 such as a rod or bar at a top of a joining element 340. A beam 309 of the lateral platform 305, 310 substantially parallel to the lateral edge 308 may also have an elongated opening 330 which may engage a second rotational element such as a rod or bar at a top of the joining element 340. Beam 309 may be an opposite lateral edge. The first and second rotational elements may be the same, e.g. each opening 300 may engage with opposite ends of a single rotational element, or may be separate, e.g. two rotational elements.

Figure 4B:
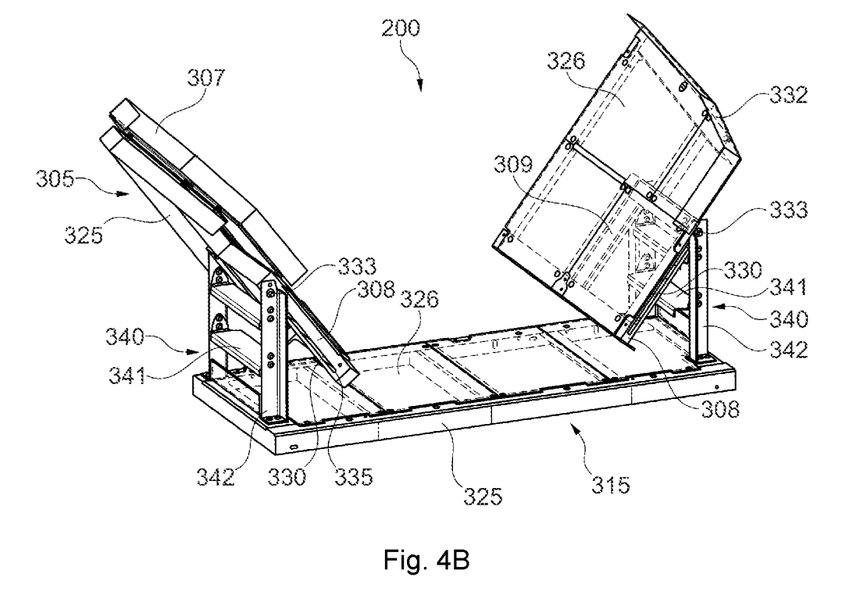
FIG. 4B schematically illustrates the supporting structure of FIG. 4A in a stowed, folded position.

A lateral platform 305, 310 may be slid and then it may be rotated about a rotational axis 339 to make the supporting structure 200 more compact. The supporting structure 200 may then pass from a deployed configuration to a stowed configuration. For example, an inside end 335 of the opening 330 may engage with a rotating element 333 when the supporting structure is unfolded, a lateral platform 305, 310 may be rotated and the lateral platform may be slid towards the central platform 315 until an outside end 336 of the opening 330 engages the rod and the lateral platform cannot continue sliding.

In other examples, a lateral platform 305, 310 may first be rotated about a rotational axis 339 and then slid.

A lateral platform 305, 310 may be longer in a direction substantially parallel to an axis of rotation 339 of the lateral platform than in a central platform 315 in the same direction. The dimensions of the lateral 305, 310 and central 315 platforms may be selected according to the places where access is desired from them. The same applies to the distance, e.g. a vertical distance, between the lateral platforms 305, 310 and the central platform 315.

Figure 4C:
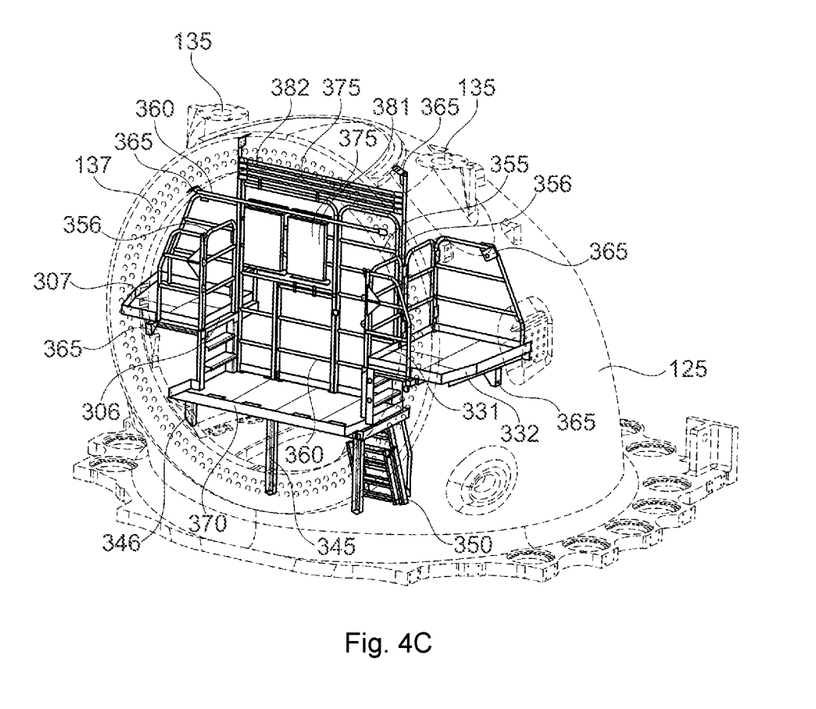
FIG. 4C schematically illustrates a perspective frontal view of the supporting structure of FIG. 4B, unfolded and with additional components, placed on the bottom of the central frame in a first configuration.

A supporting structure 200 may then be easily lifted into a central frame 125. Lifting may be through a rear opening 128 of the central frame 125. Once inside the central frame 125, the supporting structure 200 may be unfolded, lowered and attached to the central frame 125, as depicted in FIG. 4C. One or more supporting elements 345, e.g. one or more vertical beams or legs, may be attached to a bottom of the central frame 125 in order to support the platforms 305, 310, 315 when lowered. A supporting element 345 may be attached to an inside flange of a bottom of the central frame 136 or it may be attached to a bedplate 17.

A lateral platform 305, 310 may be attached, e.g. bolted, to an inside lateral surface of a central frame 125 at least by an outside edge 307, 332. One or more connection points 365 may also be used to join a platform 305, 310, 315 to an inside surface of the central frame 125. A connection point may be a corner joint or any suitable piece which allows to connect a platform to an inside surface of the central frame 125. In some examples, a platform may be directly attached to the central frame, e.g. mechanically.

Figure 4D:
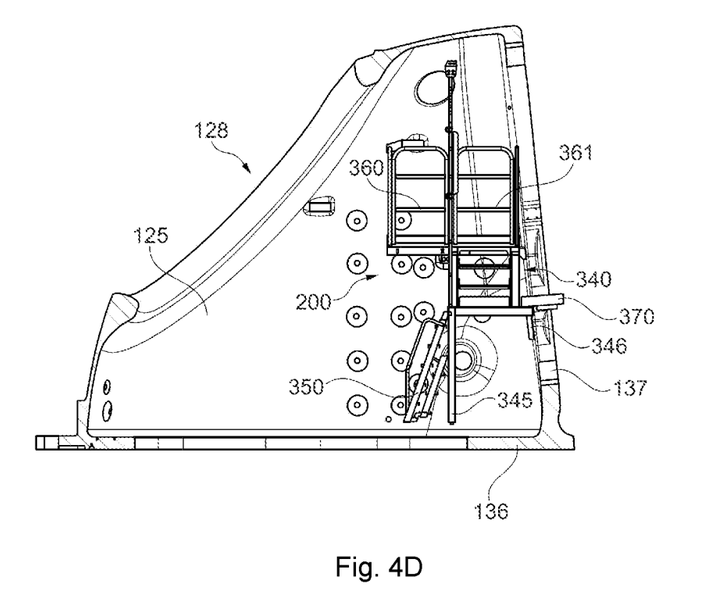
FIG. 4D schematically illustrates a cross-sectional view of the supporting structure of FIG. 4C.
Figure 4E:
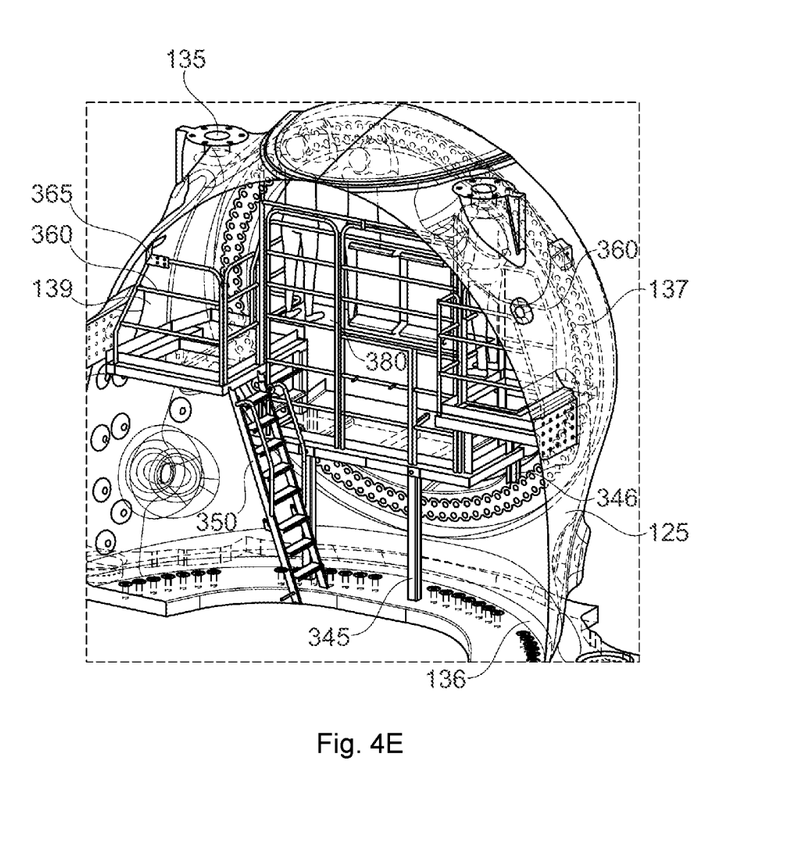
FIG. 4E schematically illustrates a rear perspective view of the supporting structure of FIG. 4C in a second configuration.

Other connection points 346 such as beams shorter than legs 345 may be used to attach an edge of the central platform 315 to a bottom portion of a front flange 137 of the central frame 125, see e.g. FIGS. 4C-4E.

Once fixed to the central frame 125, additional elements may be added to the supporting structure 200, for example as shown in FIGS. 4C and 4D.

By mounting a basic supporting structure outside the main line of production before lifting it inside the central frame 125, assembly time in the main line of production may be reduced. Once the supporting structure 200 has been attached to an inside of the central frame 125, further components may be added as required.

A ladder 350 may be attached to the central platform 315, e.g. to an edge of the central platform 315 configured to be facing a rear opening 128 of the central frame 125. One or more operators may then use the ladder 350 to access the central platform 315 from an inside of the central frame 125. An operator may need to open a door 355 to access the central platform 315 from an inside of the central frame 125. The central platform 315 may give access to the rotor hub 110.

A door 356 may be attached to an inside edge 306, 331 of a lateral platform 305, 310. Once an operator is on the central platform 315, the operator may open the door 356 and access a lateral platform 305, 310. Lifting points 135 of the central frame 125 or the nacelle 161 may be accessed from the lateral platforms 305, 310.

In some examples (not shown), a ladder or another suitable element may enable accessing a lateral platform 305, 310 without having to go on the central platform 315.

Railings 360 may also be attached to one or more edges of a platform 305, 310, 315 for increasing the security of the people on a platform. A railing 360 may have one or more connection points 365 for attaching the railing 360 to an inside surface of the central frame 125, for example a lateral inside surface and/or a top inside surface. As before, a connection point may be a corner joint or any suitable piece which allows to connect a railing 360 to an inside surface of the central frame 125. In some examples, a railing may be directly attached to the central frame, e.g. through nuts and bolts.

A platform extension 370 may be mounted to an edge of the central platform 315 configured to be facing the rotor hub 110, as depicted in FIGS. 4C and 4D.

The supporting structure 200 may comprise two or more deployed configurations. A first configuration may be for accessing a part of the central frame 125, and a second different configuration may be for accessing a second different part of the central frame 125. For example, a first configuration may enable accessing a lower portion of a front flange 137 of the central frame and the lifting points 135 of the central frame or nacelle, see e.g. FIG. 4C. A second configuration may enable accessing an upper portion of a front flange 137 of the central frame 125, see e.g. FIG. 4E.

The supporting structure 200 may also include one or more platform parts 375, as in FIG. 4C. The one or more platform parts 375 are configured to form an additional platform 380, for example above and between the lateral platforms 305, 310, as in FIG. 4E. A platform part 375 may be a platform plate 381. A platform part 375 may be a supporting element 382 for one or more platform plates 381. A supporting element 382 may be a rod or beam, such as in FIG. 4C, but other supporting elements may be used. In some other examples, a platform part may already be a single piece ready to mount and use as platform.

One or more platform parts 375 may be hanged on the railings 360, for example above the central platform 315 as illustrated in FIG. 4C.

FIG. 4E shows a supporting structure 200 with an additional platform 380 assembled. The additional platform 380 may be accessible from the lateral platforms 305, 310 and can be used to cross between them. The additional platform 380 may enable accessing an upper portion of a front flange 137 of the central frame 125.

The additional platform 380 may be mounted on horizontal railings 361 above the elements 340 joining the lateral platforms 305, 310 to the central platform 315. The lateral platforms may be configured to extend towards a rear opening 128 of the central frame 125 more than the central platform. The additional platform 380 may be configured to extend less or substantially the same towards the rear opening 128 than the central platform 315, as in FIG. 4E. The difference in extension towards the rear opening 128 of the lateral 305, 310 and central 315 platforms may be seen in FIG. 4D.

A versatile supporting structure 200 may therefore be obtained. Depending on the task to be performed, the supporting structure 200 may be configured accordingly. Each time that a particular place may need to be accessed, e.g. during installation or maintenance, mounting a specific support from scratch to access it may be not required. Access to one or more of the rotor 115, the nacelle or central frame lifting points 135 and an upper portion of the front flange 137 of the central frame 125 may be rapidly performed.

As shown in FIG. 4E, the ladder 350 which previously allowed to go to the central platform 315 may be moved to allow accessing a lateral platform 305, 310 instead the central platform. In other examples, two or more ladders may be used, e.g. one for accessing the central platform and another one for accessing a lateral platform.

In a further aspect of the present disclosure, a method 400 for handling a supporting structure 200 for use in a central frame 125 of a direct-drive wind turbine 160 is provided. Any supporting structure 200 as described with respect to FIGS. 3A-3E and 4A-4E may be used.

Figure 5:
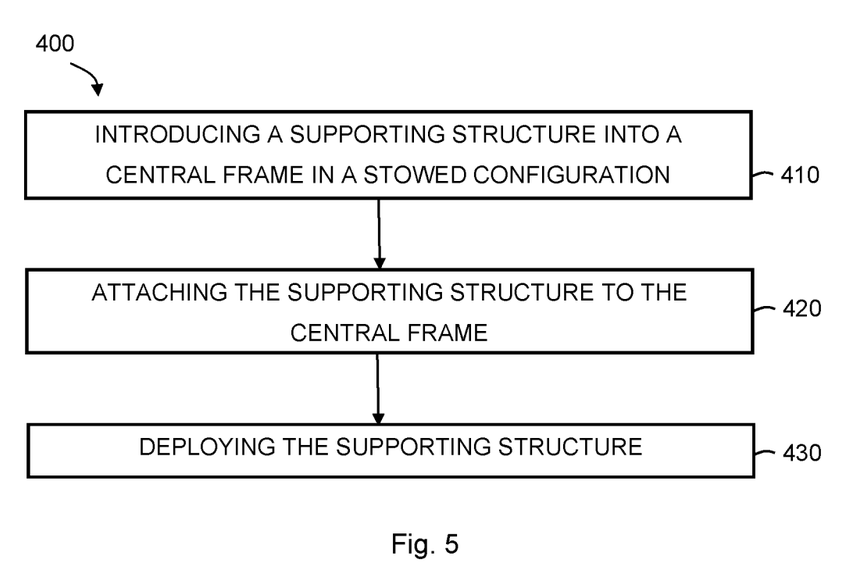
FIG. 5 schematically illustrates an example of a method for handling a support structure for a central frame of a direct-drive wind turbine.

The method comprises, at block 410, lifting and introducing the supporting structure 200 into the central frame 125 while the supporting structure 200 is in a stowed configuration. A crane or any suitable lifting tool may be used to lift the folded structure and position it inside the central frame 125.

The method may further comprise folding a first side portion 205 and a second opposite side portion 210 of the supporting structure 200 towards a central portion 215 of the structure.

A side portion of the structure 205, 210 may be attached by one or more rotatable joints or connectors 207 such as hinges to the central portion 215. Other features enabling to rotate a lateral side portion 205, 210 towards a central portion 215 may be used. For example, a rod or bar may engage a part of a side portion 205, 210, e.g. an end of a beam 206, and a rod or bar may also engage a part of the central portion 215, e.g. a horizontal protrusion, as in FIGS. 3A and 3B.

Folding the first side portion 205 and the second opposite side portion 210 may comprise rotating and sliding the first 205 and second 210 sides towards the central portion 215. Depending on the structure 200, a side such as a lateral platform 305, 310 may be first rotated and then slid or it may be first slid and then rotated. Sliding and rotation may also occur, at least in part, simultaneously. Sliding and rotating may take place as explained with respect to FIGS. 4A and 4B.

In some other examples, rotation may not be necessary, but just sliding may be enough. A side portion 205, 210 may be slid in a vertical direction, e.g. upwards or downwards, and then it may be slid in a horizontal direction such that it ends at least in part above or below the central portion 215. Other ways of folding and/or sliding the first and second side portions for reducing the dimensions of the supporting structure 200 may be possible.

The method further comprises, at block 420, attaching the supporting structure 200 to the central frame 125. At least the central portion 215 may be attached to an inside of the central frame 125.

The method further comprises, at block 430, deploying the supporting structure 200. Deploying may comprise unfolding one or more side portions with respect to a central portion 215. For example, the first 205 and second 210 side portions may be rotated to a position which they had before the supporting structure 200 was folded. Sliding instead of or in addition to rotation may be used for the unfolding.

In some examples, deploying 430 may be performed before attaching 420. The supporting structure 200, once unfolded, may be positioned on an inner flange 136 of the bottom of the central frame 125, as in FIG. 3D. Outer ends or portions of beams 206, 216, 217 forming the lateral side portions 205, 210 and the central portion may be mechanically attached to the bottom inner flange 126.

The central portion 215 may have a column 222 configured to guide at least a cable from the central frame 125 down a wind turbine tower 170. The column 222, which may be protruding upwards when the supporting structure 200 is being lifted inside the central frame 125, may be slid downwards after the lateral side portions 205, 210 have been unfolded. The column 222 may be slid downwards after at least the central portion 215 has been attached to the bottom flange 136 of the central frame 125.

In some other examples, attaching 420 may be performed before deploying 430. For example, the supporting structure 200, once unfolded, may be positioned on one or more supporting elements 345 on a bottom of the central frame 125. One or more supporting elements 345 may be attached to an inside flange of a bottom of the central frame 136 and/or they may be attached to a bedplate 17. A supporting element 345 may be a beam or a leg, e.g. a vertical beam or leg, as in FIGS. 4C and 4D. One or more legs 345 may be mechanically joined to an edge of a central platform 315 configured to face the rear opening 128 of the central frame.

Other connection points 346 such as beams or legs shorter than supporting elements 345 may be used to attach an edge of the central platform 315 configured to face a front opening 127 of the central frame 125 to a bottom portion of a front flange 137 of the central frame 125.

A lateral platform 305, 310 above the central platform 315 may be joined to an inside lateral surface 139 of the central frame 125 and/or to a front flange 137 of the central frame 125. Attachment may be direct or indirect, e.g. through connection points 365 such as corner joints. Other pieces may be used for attaching a lateral platform 305, 310 to an inside of the central frame. In FIGS. 4C-4E, the lateral platforms 305, 310 have been attached to both an inside lateral surface 139 and the front flange 137.

In this way, a supporting structure 200 for a central frame 125 of a direct-drive wind turbine 160 may be easily lifted and placed inside the central frame 125. Assembly time in a main line of production, e.g. of a nacelle 161, may be reduced as there is no need to introduce and mount individually each piece of a supporting structure 200 in the main line. A basic supporting structure as in FIG. 3A or 4A may be assembled out of the main production line and then folded and lifted into the central frame 125.

With such a supporting structure 200, access to the rotor 115 through the frontal opening 127 and access to the nacelle 161 through the rear opening 128 may be easily obtained without the need of temporary platforms or different structures to be assembled depending on the place to be accessed.

Once a relatively basic and simple supporting structure 200 has been secured to an inside of the central frame 125, such as the structure of FIG. 3A or 4A, additional components may be added.

Plates 221 may be added to one or more of the central portion 215 and the first 205 and second 210 side portions in order to create a floor 250. Floor 250 may be a bedplate 17 on which e.g. electrical cabinets and other equipment may be placed.

One or more stairs or ladders 235, 235, 350 may be added for accessing the support structure 200. A ladder 230 configured to extend in a wind turbine tower 170 may be provided for accessing one of the first 205 and second 210 side portions or the central portion 215 from an inside of the tower 170. One or more of the ladders may be foldable.

A door 240, 355 to regulate access through the front opening 127 may also be included.

In the step of deploying 430, the supporting structure may be deployed to a first configuration for accessing a first part of the central frame. The method may further comprise deploying the supporting structure the to a second different configuration for accessing a second different part of the central frame. For example, a first configuration may enable accessing a lower portion of a front flange 137 of the central frame and the lifting points 135 of the central frame or nacelle, see e.g. FIG. 4C. A second configuration may enable accessing an upper portion of a front flange 137 of the central frame 125, see e.g. FIG. 4E.

In some examples, where the first side portion 205 comprises a first lateral platform 305, and the second side portion 210 comprises a second lateral platform 310, the method may further comprise adding, e.g. detachably joining, one or more platform parts 375 to the supporting structure 200. The one or more platforms parts may be used when needed for assembling an additional platform 380, e.g. above and between the first 305 and second 310 lateral platforms.

A platform part 375 may be a platform plate 381. A platform part 375 may be a supporting element 382 for one or more platform plates 381. A supporting element 382 may be a rod or beam, such as in FIG. 4D, but other supporting elements may be used. In some other examples, a platform part 375 may be an integral single piece which may be ready to use once placed in an appropriate location.

One or more platform parts 375 may be hanged on one or more railings 360 previously provided. One or more platform parts 375 may for example be attached above the central platform 315 as illustrated in FIG. 4D.

Once the additional platform 380 is mounted, an operator may access it from any of the lateral platforms 305, 310. The additional platform 380 may enable accessing an upper portion of a front flange 137 of the central frame 125.

If the additional platform 380 is placed at a height such that access to the lateral platforms 305, 310 from the central platform 315 is blocked, as in FIG. 4E, ladder 350 or any other suitable tool may be used to access a lateral platform 305, 310 and then the additional platform 380.

A versatile and adaptable supporting structure 200 may therefore be provided and assembled depending on the task and the place where it needs to be performed. Each time that a particular place may need to be accessed, e.g. during installation or maintenance of the central frame, the nacelle or the wind turbine, mounting a specific support to access it may be not required. Access to one or more of the rotor 115, the central frame or nacelle lifting points 135 and an upper portion of the front flange 137 of the central frame 125 may be rapidly performed.

Still a further aspect of the invention provides another supporting structure 200 for a central frame 125 of a direct-drive wind turbine 160. The supporting structure 200 comprises a first side 205 comprising a first lateral platform 305, a second opposite side 210 comprising a second lateral platform 310, and a central portion 215 comprising a central platform 315. The first 305 and second 310 lateral platforms are above the central platform 315 and they are configured to be rotated and slid with respect to, e.g. towards, the central platform 315.

In an unfolded position, as in FIG. 4A, the supporting structure 200 may have a U-shaped cross-section (in a cross-section including joining elements 340 such as stairs).

The first 305 and second 310 lateral platforms may be configured to enable access to one or more lifting points 135 of the central frame 125. The central platform 315 may be configured to give access to the rotor 115.

The supporting structure 200 may further comprise an additional platform 380. The additional platform 380 may be mounted between and above the first 305 and second 310 lateral platforms. The additional platform 380 may be provided in an unassembled state and may comprise one or more platform parts 375, as e.g. in FIG. 4C, and then be assembled when required as e.g. in FIG. 4E.

The additional platform 380 may be configured to enable access at least to an upper portion of the frontal flange 137 of the central frame 125.

The explanation provided with respect to FIGS. 4A to 4E may be applied to this supporting structure 200. Similarly, such a supporting structure 200 may also be used in a method 400 as described above.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A supporting structure for deployment and use within a central frame of a direct-drive wind turbine, wherein the central frame is a portion of a main frame mounted to a wind turbine tower, the supporting structure comprising:
a stowed configuration wherein the supporting structure has a shape and size such that the supporting structure is insertable from outside into the central frame;
a deployed configuration wherein the supporting structure has one or more increased dimensions with respect to the stowed configuration;
a working platform in the deployed configuration;
a central portion connectable to the central frame completely within the central frame; and
wherein the supporting structure is separate from and insertable through an opening in the central frame, and in the stowed configuration and the deployed configuration, the supporting structure is contained completely within the central frame.

2. The supporting structure according to claim 1, wherein the deployed configuration comprises a first deployed configuration configured for accessing a first part of the central frame and a second deployed configuration configured for accessing a second different part of the central frame.

3. The supporting structure according to claim 1, further comprising one or more side portions hingedly mounted with respect to the central portion.

4. The supporting structure according to claim 3, further comprising one or more parts configured to translate with respect to the central portion from a first position to a second position.

5. The supporting structure according to claim 4, wherein the one or more parts are slidably arranged with respect to the central portion.

6. The supporting structure according to claim 3, wherein the central portion comprises a central platform and the side portions comprise a first side portion and a second side portion, the first side portion comprising a first lateral platform and the second side portion comprising a second lateral platform, and wherein in the deployed configuration the first and second lateral platforms are arranged at a different vertical level than the central platform.

7. The supporting structure according to claim 6, wherein the first and second lateral platforms rotate and slide with respect to the central platform.

8. The supporting structure according to claim 6, further comprising an additional platform.

9. The supporting structure according to claim 8, wherein the additional platform is configured to be accessible from the first and second lateral platforms.

10. A method for handling a supporting structure for use a within central frame of a direct-drive wind turbine, wherein the central frame is a portion of a main frame mounted to a wind turbine tower, the method comprising:
lifting and introducing the supporting structure into the central frame while the supporting structure is in a stowed configuration;

attaching a central portion of the supporting structure to structure of the central frame completely within the central frame;

deploying the supporting structure from the stowed configuration to a deployed configuration; and wherein in the stowed and deployed configurations, the supporting structure is contained completely within the central frame.

11. The method according to claim 10, wherein deploying the supporting structure comprises rotating or sliding one or more side portions of the supporting structure with respect to the central portion of the supporting structure.

12. The method according to claim 10, wherein the supporting structure is deployed to a first configuration for accessing a first part of the central frame and is deployed to a second different configuration for accessing a second different part of the central frame.

13. The method according to claim 10, wherein the supporting structure includes first and second side portions hingedly mounted with respect to the central portion, the first side portion having including a first platform and the second side portion including a second platform, the method further comprising adding one or more platform parts to the supporting structure for assembling an additional platform.

14. The method according to claim 10, further comprising attaching the supporting structure to a bottom flange of the central frame.

15. The method according to claim 10, further comprising attaching the supporting structure to a bottom of a front flange of the central frame.

* * * * *